(12) United States Patent
Sarbin

(10) Patent No.: US 8,910,063 B2
(45) Date of Patent: Dec. 9, 2014

(54) ASSISTED DISPLAY FOR COMMAND LINE INTERFACES

(75) Inventor: Brian Sarbin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 13/431,840

(22) Filed: Mar. 27, 2012

(65) Prior Publication Data

US 2013/0263043 A1     Oct. 3, 2013

(51) Int. Cl.
    *G06F 3/048* (2013.01)

(52) U.S. Cl.
    USPC ............ 715/763; 715/967; 715/784; 717/124; 717/106

(58) Field of Classification Search
    USPC ........... 715/784, 700, 763, 967; 717/124, 106
    See application file for complete search history.

(56) References Cited

U.S. PATENT DOCUMENTS

| 2002/0196285 | A1* | 12/2002 | Sojoodi et al. | 345/771 |
| 2009/0187824 | A1* | 7/2009 | Hinckley et al. | 715/711 |
| 2012/0223889 | A1* | 9/2012 | Medlock et al. | 345/168 |

OTHER PUBLICATIONS

Stephens, Rod, Visual Basic 2010: Programmer's Reference, Mar. 8, 2010, Wrox, pp. 3-6, 11-14, 39, 67-68, 72-76, 86, 92, 123, 249-250, 403, 598, 805, 1116, xlviii.*
MSDN Microsoft, Debug Toolbar Visual Studio 6.0, Jan. 28, 2011, http://msdn.microsoft.com/en-us/library/aa239210(v=vs.60).aspx, pp. 1-4.*

* cited by examiner

*Primary Examiner* — Kieu Vu
*Assistant Examiner* — Joy M Weber
(74) *Attorney, Agent, or Firm* — Hickman Palermo Truong Becker Bingham Wong LLP

(57) ABSTRACT

A method for an assisted display for command line interfaces is described. In an embodiment, an input region and an output region of a command line interface are displayed. Commands are displayed within the input region as they are received. A history is maintained that stores the output of previous executions. At least a portion of the output maintained by the history is displayed within the output region. The output region is scrolled by adding one or more outputs from the history to the display of the output region and/or removing one or more outputs from the display of the output region. Wherein, scrolling the output region does not cause the display of the input region to become obscured. In another embodiment, an input assistance region is displayed that walks a user through selecting commands supported by the command line interface as well as options and arguments for those commands.

30 Claims, 9 Drawing Sheets

ASSISTED DISPLAY FOR COMMAND LINE INTERFACES

TECHNICAL FIELD

The present disclosure generally relates to user interface displays for electronic devices, including mobile computing devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A command line interface (CLI) is a facility of a computer program for communicating with a computing device, computer operating system or other software by typing in commands to perform specific tasks. The method of instructing an electronic device, such as a computer, to perform a specific task is generally referred to as "entering" a command.

In some cases, the CLI waits while a user types a command until the user gives an indication that the command is ready to be executed. For example, the CLI may wait until a carriage return, newline or other character is received from the user. At that point, the CLI may parse the text constituting the command in order to determine whether the text matches the syntax of a command supported by the CLI.

In some implementations, the syntax of a command may define many distinct parts such as the name, options, and arguments of a command. Where the name serves to identify a command, the options and arguments modify the execution of a command. For example, when a command is executed, the program or code that performs the task may be implemented to handle the task in a multitude of different ways. Often times, the program will use one particular method by default when handling the task. However, the options of a command may allow a user to specify a method that deviates from the default method. For example, a command may perform the task of returning a list of files in a directory. By default the files may be returned in alphabetical order, but an option may exist that causes the files to be returned in a different order, such as by modification date. Arguments, on the other hand, often times allow the user to specify targets for the task that the program or code performs. For example, a command may copy a file from one location to another. Such a command may require two arguments, the name of the file to be copied and the location where the copy should be stored.

However, options and arguments are not limited to the roles that have been described. Both options and arguments serve as means of relaying information to the program or code that is performing the task. Consequently, it is up to the program or code to interpret the effect that the options and arguments should have.

If the parsing is successful, the CLI may invoke the program that implements the command and pass any options and arguments to the program. If the program produces output during the execution of the command, the CLI may display that output to the user. However, in some cases, the CLI may be able to execute the command itself, provided that the CLI contains the code necessary to perform the task or can import the code from a source such as a library.

A CLI is a powerful tool, but the users of a CLI must know the commands that are supported by the CLI as well as the correct syntax for entering those commands. Commands typically are formed using abbreviated, truncated or otherwise modified natural language words, or code words, values, and parameters. Typically the form or format of a command, and all possible values for parameters, are difficult for human users to memorize or remember. Consequently, the learning curve for a novice user may be very steep. Furthermore, even experienced users will often times forget commands that are not used regularly. Thus, users may end up spending a significant amount of time researching commands and syntax.

SUMMARY OF THE INVENTION

The appended claims may serve as a summary of the invention.

DESCRIPTION OF EXAMPLE EMBODIMENTS

Figure 1:
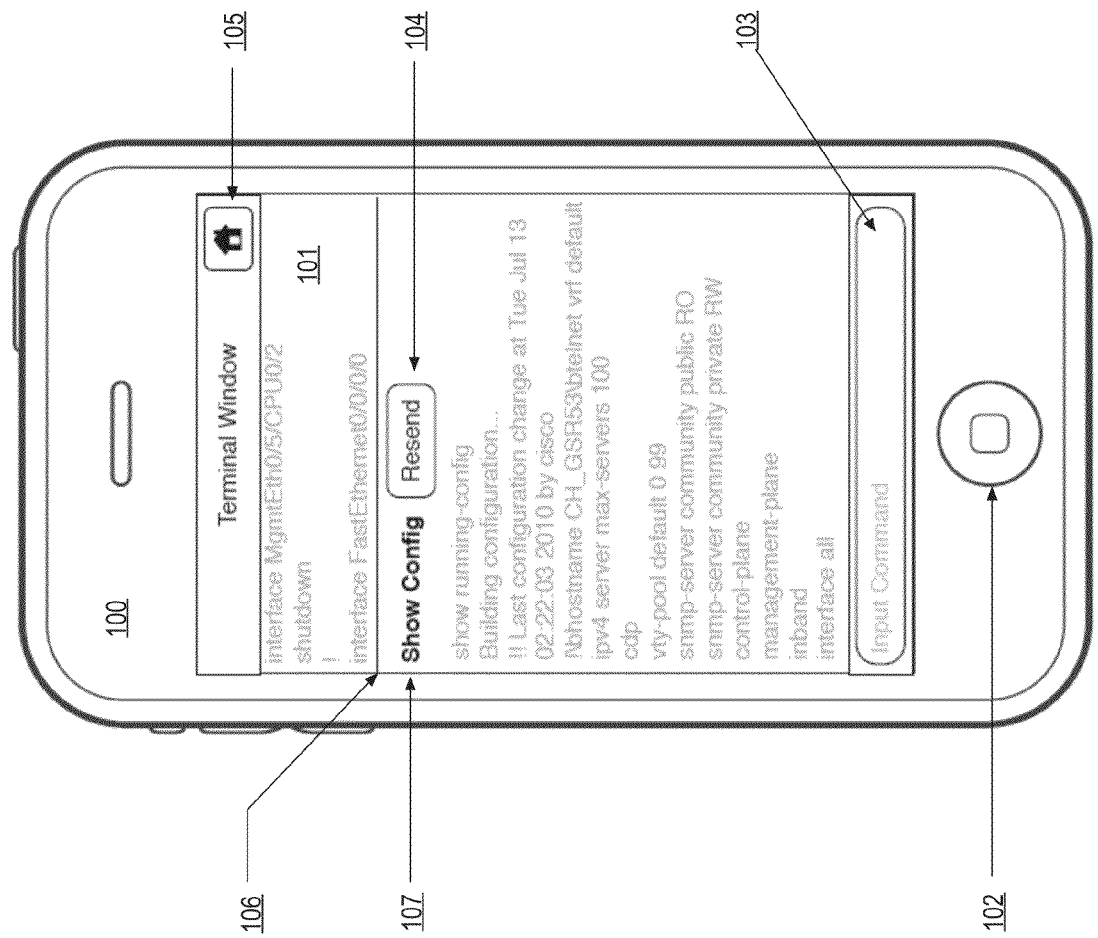
FIG. 1 illustrates an embodiment of a user interface display for a computing device having an input region and an output region.

An assisted display for command line interfaces is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Split Screen
   3.0 Input Assistance
      3.1 Command Selection
      3.2 Drill Down
      3.3 Command Prediction
      3.4 Option Selection
      3.5 Argument Selection
      3.6 Submission
   4.0 Implementation Mechanisms—Hardware Overview
   5.0 Extensions and Alternatives
   1.0 Overview A method for an assisted display for command line interfaces is described. In an embodiment, an input region and an output region of a command line interface are displayed.

Commands are displayed within the input region as they are received. A history is maintained that stores the output of previous executions. At least a portion of the output maintained by the history is displayed within the output region. The output region is scrolled by adding one or more outputs from the history to the display of the output region and/or removing one or more outputs from the display of the output region. Wherein, scrolling the output region does not cause the display of the input region to become obscured.

In another embodiment, an input assistance region is displayed that lists commands that are supported by a command line interface. In response to receiving a partially entered command, a determination is made as to whether one or more commands supported by the command line interface are likely to be the command that will be entered. The input assistance region is updated to remove commands from the display that are determined unlikely to be entered. If a drill down graphical element associated with a command is selected, the input assistance region displays a manual page for the associated command. If a command is selected, the input assistance region displays a list of options for the selected command. If a drill down graphical element associated with an option is selected, the input assistance region displays detailed information related to the associated option. If a set of options is selected, the input assistance region displays a list of arguments for the selected command. If a set of arguments is selected, the input assistance region displays a submission screen. The submission screen displays a countdown that, when finished, causes the selected command to be executed with the selected set of options and the selected set of arguments.

Embodiments generally provide a method of providing an assisted display for a command line interface. Embodiments may be implemented on virtually any computer system including, but not limited to, mobile devices, laptops, and desktops.

In other embodiments, the invention encompasses a computer apparatus and a computer-readable medium configured to carry out the foregoing steps.

2.0 Split Screen

For the purpose of illustrating clear examples, some features described herein may provide a particular method of user input such as clicking a button, tapping a graphical element, typing keys on a keyboard, or dragging a scroll bar among others. However, the exact method of user input chosen by an embodiment is not critical. Thus, each specific method of user input that is mentioned with reference to a feature provides only one example of a potential way that a user may interact with that feature and is not intended to limit the feature to that method. Furthermore, a user may not always be a natural person. In some embodiments, a user may be an application that supplies input to the CLI by, for example, communicating through an application programming interface (API), a server computer, or any other computing device or system.

FIG. 1 illustrates an embodiment of a user interface display of a computing device having an input region 103 and an output region 101. In an embodiment, the user interface display is hosted on or is run on computing device 100. Computing device 100 contains input device 102 and displays terminal window 105.

Computing device 100 may comprise any of a personal computer, laptop computer, netbook computer, ultrabook computer, tablet computer, smartphone, or other mobile computing device. Input device 102 may comprise any of a touchscreen, mouse, trackball, or keyboard. Terminal window 105 may be generated using a windowed operating system or a window manager coupled to an operating system, kernel or supervisor.

Terminal window 105 contains input region 103 and output region 101. Input region 103 displays a shaded message informing the user to input a command. Output region 101 displays text representing the output of executed commands and the output of each execution is separated by a delimiter 106, a command name 107, and a resend button 104.

In an embodiment, the input region 103 displays a command that a user is currently entering. For example, a command may be displayed within the input region 103 as a string of numbers, letters, spaces, punctuation marks, and other characters. In some embodiments, the input region 103 may display a blank string, a string containing no characters, by default. In other embodiments, the input region 103 may display a message to the user by default that is cleared once a user begins to enter a command. In an embodiment, the message may indicate where commands typed in by the user will be displayed.

In some embodiments, the command displayed within the input region 103 may be edited. For example, when a character is received from the user, that character may be added to the string displayed by the input region 103. In some embodiments, the character may be added to the end of the string. However, in other embodiments, a user may insert a character at a specific position within the string. In the same fashion, an embodiment may also allow a user to edit the command by deleting or overwriting characters within the string.

In some embodiments, the CLI may provide a way for users to specify that the command is ready to be executed. For example, the CLI may be configured to wait for a control character, such as a carriage return, double-tap, or other key, character or gesture that causes the CLI to execute the command displayed within the input region 103. A control character acts as a flag that informs the CLI to perform a specific function. Control characters may not represent any textual symbol and thus are not displayed within the input region 103 when they are received. In other embodiments, a button or other graphical element may provide the same function as a control character.

In some embodiments, the input region 103 may be cleared or returned to its default state once the user has specified that the command is ready to be executed. However, other embodiments may wait to clear or reset the input region 103 until after the actual execution of the command has occurred.

Once a command is executed, the command may be stored in a history data structure or buffer that keeps track of commands that have previously been entered. In an embodiment, the previously entered commands may appear within the history or buffer in a particular order, such as chronological order based on the time of execution. With such an embodiment, the CLI may allow a user to search or scroll through the previously entered commands in the same order as they appear in the history or log. In an embodiment, the CLI may display the next command of the history or buffer within the input region 103 in response to receiving a particular control character. Thus, by repeatedly entering the particular control character, a user may scroll through the previously entered commands. In an embodiment, the CLI may also allow the user to scroll back in reverse order by entering a different control character. However, other embodiments may employ buttons, pop-up lists, scroll bars or other graphical elements that perform the same functions as the control characters. In an embodiment, once a previously entered command is displayed within the input region 103, the CLI may allow the user to edit and/or enter the command.

In some embodiments, the history or buffer may be maintained for all the commands that have previously been entered. However, an embodiment may maintain a history or buffer only for the user's current working session. In other embodiments, the history or buffer may be limited to storing only a specific number of commands. For example, the amount of memory available to the history or buffer may be capped. In such an embodiment when the capacity of the history or buffer has been reached, older commands may be removed. Still other embodiments may maintain multiple histories or buffers, each with their own criteria for determining which commands should be stored.

Once a command is entered, a CLI may execute the command by invoking the program or code that implements the command. In an embodiment, the program or code may return output to the CLI in the form of text that is displayed within the output region 101.

In an embodiment, outputs from multiple executions may be displayed by the output region 101 simultaneously and the CLI may provide one or more delimiters that visually separate the output produced from different executions. In addition, the region belonging to a particular execution may contain information about the execution such as the name of the executed command. However, other embodiments may display additional information such as the options and arguments submitted with the command or a timestamp of when the execution occurred.

Furthermore, the region belonging to a particular execution may contain one or more graphical elements representing functions that are associated with that particular execution. For example, an execution may be associated with a "resend" button 104. When the resend button 104 is selected, the command executed during that execution may be re-executed. In an embodiment, the command may be re-executed with the same options and arguments as the original execution. However, other embodiments may allow the command to be edited before re-execution. For example, the CLI may provide an "edit/resend" button that causes the associated command to be displayed within the input region 103 where the command may be edited before being entered.

In some cases, the output may be too voluminous to fit entirely within the output region 101 without substantially degrading readability. Consequently, some embodiments may display only a portion of the output at a time. The size of that portion may be based upon factors such as the size of the output region 101, the size of the font, the style of the font, the spacing between the characters of the text, and the spacing between the lines of the text. In some embodiments, the CLI may define default values for the settings represented by the preceding factors. However, in other embodiments, the settings may be defined or modified by a user. Furthermore, in some embodiments, the number of characters that can fit on each line of the output region's display may be limited. Therefore, output that would exceed the character limit may "wrap around" to the next line of the output region's display. The number of characters that can fit on each line of the output region's display may be based on settings, such as those previously described.

In an embodiment, a user may be interested in viewing output that has been received by the CLI, but is not part of the portion currently displayed within the output region 101, and some embodiments may store output in an output history or buffer that the user can search or scroll through. In an embodiment, the output within the history or buffer may appear in a particular order, such as chronological order based on when the output was received. In another embodiment, the portion of output displayed within the output region 101 may correlate to a region of text contained within the output history or buffer. In an embodiment, a CLI may provide a graphical element, such as a scroll bar, that allows the user to adjust the region of the history or buffer that is being displayed, and lines of text may be added to or removed from the output region 101 so that the portion displayed by the output region 101 correlates to the adjusted region of text within the output history or buffer.

In some embodiments, the output history or buffer may be maintained for all output that has previously been received. However, an embodiment may maintain an output history or buffer only for the user's current working session. In other embodiments, the output history or buffer may have only a finite amount of memory in which to store outputs. As such, when the capacity of the output history or buffer has been reached, older outputs may be removed. Still other embodiments may maintain multiple output histories or buffers, each with their own criteria for determining which outputs should be stored. Furthermore, some embodiments may combine the output history or buffer and the command history or buffer into a single repository.

In an embodiment, the output region 101 and the input region 103 may scroll independently of each other. For example, there are times when a user may want to review the output of a previous execution at the same time that the user is entering a command, and the user may find it convenient to be able to see the command that is currently being entered while the output region 101 is being scrolled. Therefore, in an embodiment, the scrolling of the output region 101 may have no effect on the display of the input region 103 or an effect that still allows the input region 103 to remain visible.

In another embodiment, the scrolling of the input region 103 and the output region 101 may be linked. For example, if the input region 101 is scrolled to a previous command, the output region 101 may simultaneously scroll to the output produced from the execution of that previous command and vice versa.

3.0 Input Assistance

In some cases, the user may be unfamiliar with the commands that are supported by the CLI. For example, the user may have trouble locating a suitable command or may be unable to recall the correct syntax for a desired command. Certain embodiments may provide an input assistance region that displays information related to the commands that are supported by the CLI. In some embodiments, the input assistance region may also provide a wizard that walks the user through constructing a command.

In some embodiments, the CLI may display only the input and output regions by default, and the CLI may display the input assistance region in response to a particular trigger. In an embodiment, the CLI may provide a button or other graphical element that causes the input assistance region to be displayed. In another embodiment, the input assistance region may be displayed in response to a user beginning to enter a command, such as when a character is received from the user.

In an embodiment, the input assistance region may replace the input region 103 or the output region 101. In such embodiments, the CLI may provide a "close" button or other graphical element that closes the input assistance region and returns the region that was replaced. However, in other embodiments, the input region 103, output region 101, and input assistance region may be displayed simultaneously. In such embodiments, the size of the input region 103 and/or the output region 101 may be adjusted to accommodate the addition of the input assistance region. Should the input assistance region close, the input and output regions may return to their previous sizes.

Figure 2:
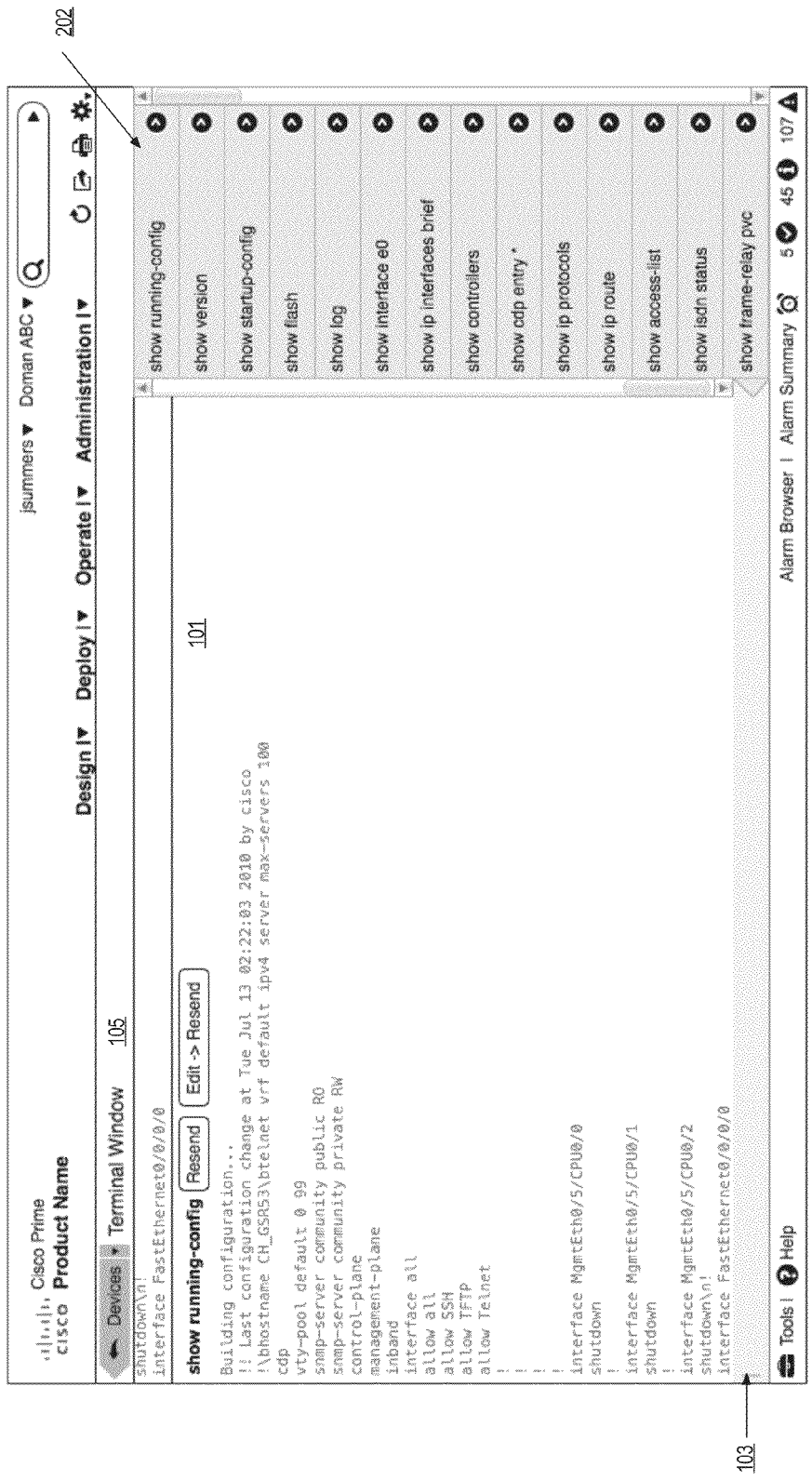
FIG. 2 illustrates an embodiment where the input, output, and input assistance regions are displayed simultaneously.

In other embodiments, the input assistance region may be displayed concurrently with the input and output regions by default. FIG. 2 illustrates an embodiment in which a computing device displays a screen display that comprises a terminal window 105 that simultaneously contains output region 101, input region 103, and input assistance region 202. FIG. 2 represents an embodiment that may be used typically with a computing device that has a larger sized display, such as a tablet computer, desktop or laptop personal computer. Output region 101 displays the output of a command that has been executed. Input region 103 comprises a data entry field into which a command may be entered. In an embodiment, the output region 101 displays one or more delimiters that visually separate the output of different executions. In an embodiment, the delimiters include the name of the executed command in association with buttons or other UI widgets that are configured to resend the command or invoke a function that permits editing before resending the command. In the example of FIG. 2, two buttons labeled Resend and Edit->Resend are provided for the executed command, "show running-config".

Input assistance region 202 comprises a list commands that are supported by the CLI that match the most recently entered command (or a command that a user is currently entering) in one or more aspects. For example, because the most recently entered command was "show running-config," the input assistance region 202 lists both that exact command, and other commands that match the keyword "show" or other keywords. The order of commands shown in input assistance region 202 may vary in various embodiments. In an alternative embodiment, the input assistance region 202 may update the list of commands when the output region 101 is scrolled to display commands related to the command that produced the output displayed within the output region 101. In another alternative embodiment, the input assistance region 202 may list the full library of commands that are supported by the CLI. In addition, the commands may be listed within the input assistance region 202 in order of the last time the command was executed. In an embodiment the list of commands may be scrolled to the most recently executed command by default. In another embodiment, the list of commands may be scrolled to the least recently executed command by default. In yet another embodiment, the most recently executed command may have a static spot at the top or bottom of the list regardless of the order maintained for the other commands. In such embodiments, the input assistance region 202 may, by default, start scrolled to the most recently executed command.

3.1 Command Selection

Figure 3:
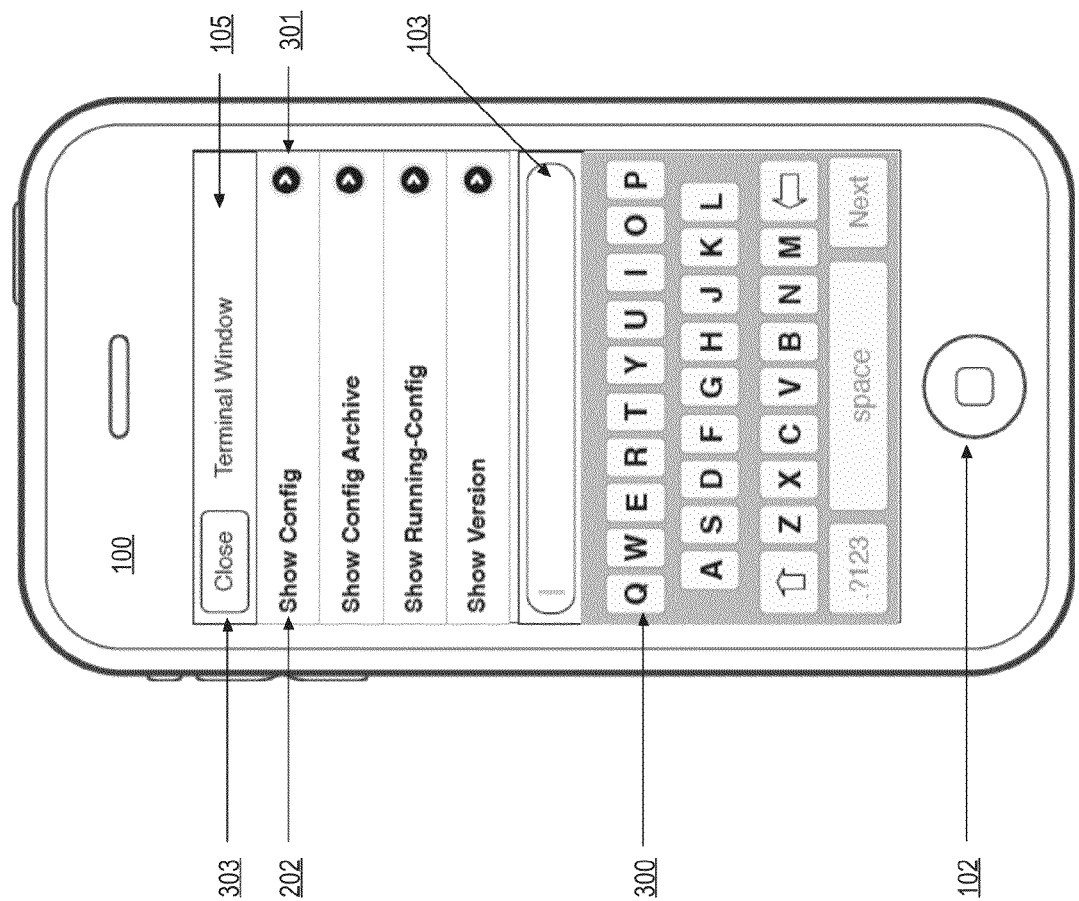
FIG. 3 illustrates an embodiment that displays a command selection screen within the input assistance region.

FIG. 3 illustrates an embodiment that displays a command selection screen within an input assistance region 202. The embodiment is run on computing device 100. In the example of FIG. 3, computing device 100 is a smartphone. Computing device 100 contains input device 102 and displays terminal window 105 in a display device such as an LCD display. In an embodiment, input device 102 is a pushbutton. Terminal window 105 displays input region 103, input assistance region 202, keyboard 300 and "close" button 303. The input region 103 is configured to receive user input in the form of typed commands and parameter values. The input assistance region 202 is configured to display a list of matching or related commands that may assist the user in confirming the accuracy of user input or selecting a correct command. The keyboard 300 may be a touch-sensitive region configured to receive taps that represent keystrokes, or may be an electromechanical keyboard. The "close" button 303 may comprise a user interface widget that is configured to receive a tap, click or other input and, in response, to close the input assistance region 202 and cause the computing device 100 to change state. Input assistance region 202 displays a list of commands that are supported by the CLI and each command is associated with a drill-down button 301 which, when selected, causes the computing device to display additional information about the associated command, as further described herein, for example, for FIG. 4.

In some embodiments, the input assistance region 202 initially displays a command selection screen that displays a list, or part of a list, of commands that are supported by the CLI. The display of input assistance region 202 in FIG. 3 may serve as an example of such a command selection screen. In one embodiment, the list may contain all the commands that are supported by the CLI. However, other embodiments may limit the list to a subset of the commands that are supported by the CLI. For example, some commands may be limited to users with certain privileges, such as an administrator. Thus, if a user does not have the privileges required to run a command, the command may not appear on the list.

In some cases, the input assistance region 202 may not be able to display all the commands on the list at the same time without substantially degrading readability. Therefore, an embodiment may display only part of the list at a time and allow the user to search or scroll through the list. In an embodiment, the number of commands that are displayed concurrently may be dependent upon factors such as the size of the input assistance region 202, the size of the font, the style of the font, the spacing between the characters of the text, and the spacing between the lines of the text. As with the display of the output region 101, the settings represented by the preceding factors may be set automatically by the CLI or manually by the user.

In some embodiments, the commands may be maintained in an ordered list. For example, the commands initially displayed by the input assistance region 202 may correspond to a number of commands that are at the top of the list. Additionally, when the list is scrolled, commands may be displayed in the same order as they appear on the list. In an embodiment, the list may be maintained in alphabetical order. In another embodiment, a user may create a "favorites list" or otherwise designate certain commands to appear before others. In still other embodiments, the list may be ordered based on statistics collected from the user such as the frequency with which a user executes a particular command.

In some embodiments, the user may tentatively select a command by, for example, tapping on the command. In response, the CLI may display the tentatively selected command in a manner that is visually distinct from other commands on the list, such as by highlighting the tentatively selected command. In an embodiment, a user may deselect a tentatively selected command by selecting the command again or the command may be automatically deselected if a different command is chosen. In another embodiment, selection of a command is finalized by the user submitting a confirmation such as by pressing a "next" button 500. In other embodiments, the CLI may finalize the selection of a command immediately upon receiving the user's selection.

In some embodiments, the name of the selected command may be displayed within the input region 103 where the user may edit or enter the command. In an embodiment, the CLI may not wait for a command to be finalized before displaying the command within the input region 103. For example, the input region 103 may display the name of the command when the command is selected and remove the name of the command when the command is deselected.

3.2 Drill Down

Figure 4:
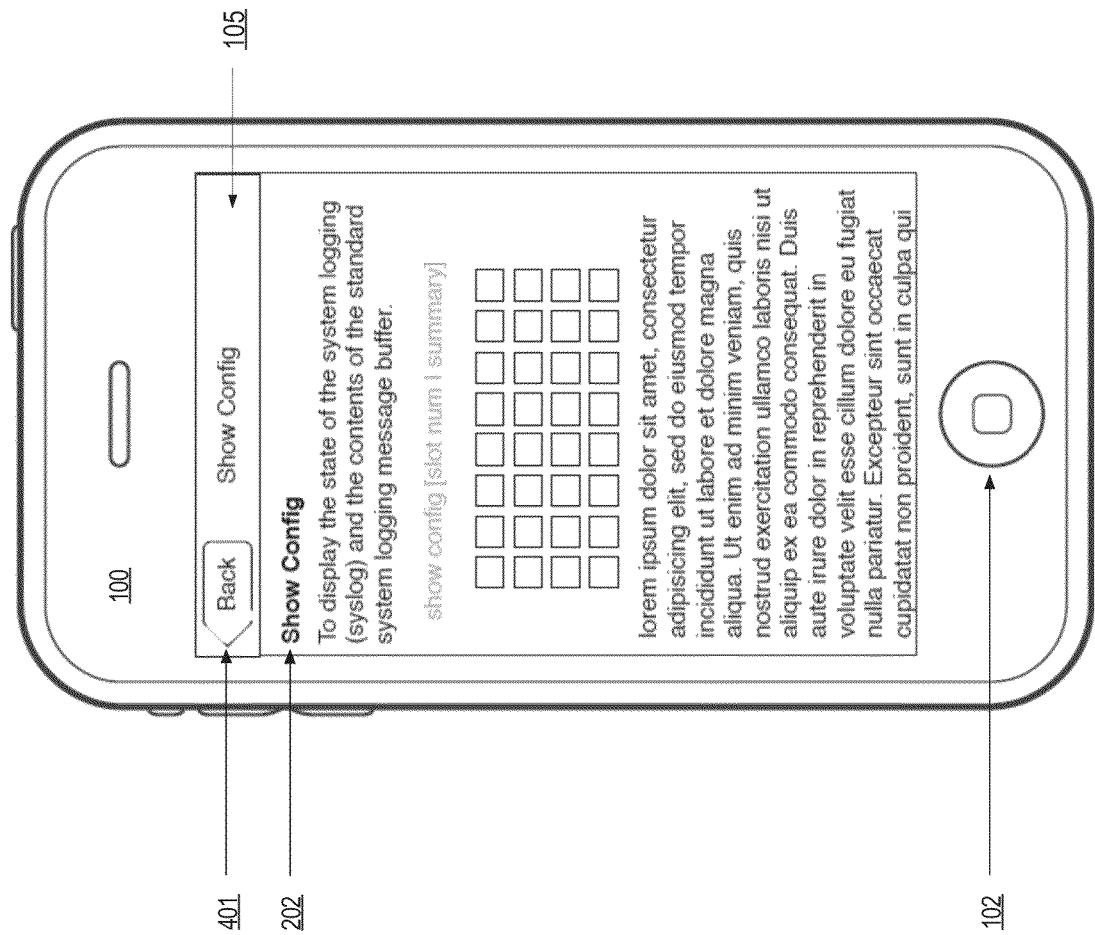
FIG. 4 illustrates an embodiment that displays the manual page for a command within the input assistance region.

FIG. 4 illustrates an embodiment that displays the manual page for a command within the input assistance region 202. The embodiment is run on computing device 100. Computing device 100 contains input device 102 and displays terminal window 105. Terminal window 105 displays input assistance region 202 and "back" button 401. Input assistance region 202 displays a manual page for the command "show config". The computing device 100 may display the arrangement of FIG. 4, for example, when a user is viewing the screen display of FIG. 3 and selects the drill-down button 301 that is adjacent to the "show config" command in the command list of FIG. 3.

In an embodiment, each command listed within the input assistance region 202 of FIG. 3 may be associated with a graphical element such as a drill-down button 301. The drill down button 301, once selected, causes the input assistance region 202 to display a manual page for the associated command as seen in FIG. 4. The manual page may contain additional information related to the command including, but not limited to, a detailed description of the command, the syntax of the command, the options of the command, the arguments of the command, and examples of how the command may be used. In other embodiments, the manual page may be displayed in response to a command being tentatively selected for a set period of time. In still other embodiments, the user may control a pointer and the manual page may be displayed in response to the pointer hovering over the command for a set period of time.

In some embodiments, the terminal window may provide a "back" button 401 or other graphical element or UI widget which, when selected, causes the input assistance region 202 to return to its previous display. In an embodiment, displaying the manual page may cause the input assistance region 202 to expand, thus taking up a greater portion or an entirety of the terminal window 105. As a result, the input region 103 of FIG. 3 may shrink or close to compensate for the expansion of the input assistance region 202. In another embodiment, the input assistance region 202 may be displayed concurrently with an output region 101 during command selection. As a result, the output region 101 may shrink or close instead of or in addition to the input region 103. In an embodiment, the "back" button 401 may also cause returning the input assistance region 202 to its previous size and restoring the input region 103 (FIG. 3) and/or output region 101.

3.3 Command Prediction

Figure 5:
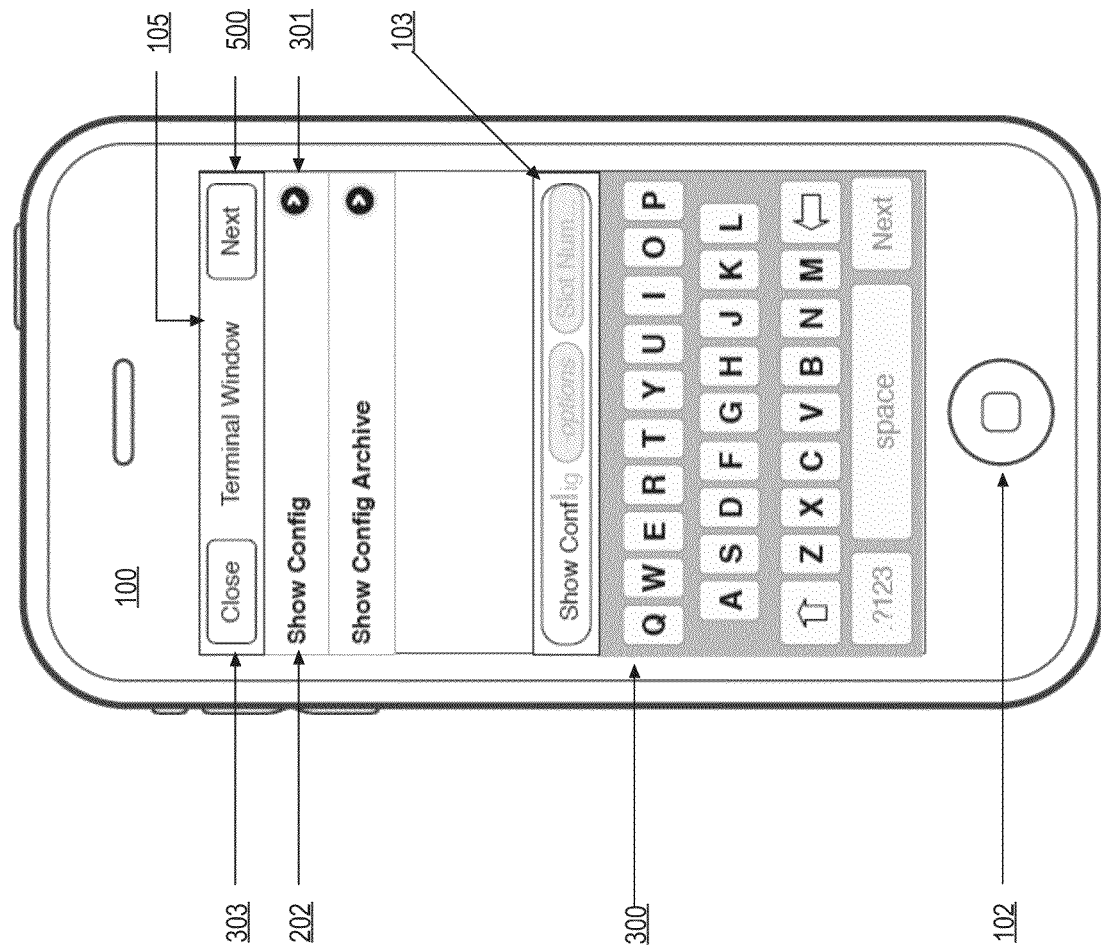
FIG. 5 illustrates an embodiment that displays a list of predicted commands based upon a partially entered command.

FIG. 5 illustrates an embodiment that displays a list of predicted commands based upon a partially entered command. The embodiment is run on computing device 100. Computing device 100 contains input device 102 and displays terminal window 105. Terminal window 105 contains input assistance region 202, input region 103, keyboard 300, "close" button 303, and "next" button 500. Input assistance region 202 displays a list of predicted commands based on the partially entered command "show conf" that is displayed within input region 103. Each predicted command on the list in input assistance region 202 is associated with a drill-down button 301 that may be displayed adjacent to the predicted command.

In some embodiments, the CLI may predict or suggest commands that a user is likely to enter based on a user's partially entered command. For example, the input assistance region 202 may initially display a list of commands that are supported by the CLI. However, as the user enters characters into the input region 103, the CLI may recognize that some commands are more likely than others to be the command that the user will ultimately enter. In response, the CLI may update the list by removing unlikely commands and therefore limit the display of the input assistance region 202 to commands that are likely to interest to the user. However, in other embodiments, commands determined not to be of interest to the user may be repositioned further down the list rather than removed.

In some embodiments, the list of predicted commands may be updated every time a character operation is performed on the string displayed by the input region 103, such as an insertion, substitution, or deletion. In addition, character operations may cause commands that have been removed from the list to be reevaluated. Further, the update may also add commands back to the list that, in light of the new information, are determined to be of interest to the user. However, other embodiments may allow the user to control the updates by providing a button or other graphical element that causes the list to be updated.

In some embodiments, predicted commands are determined by comparing a partially entered command to the commands that are supported by the CLI. In an embodiment, the CLI may determine whether the string of characters displayed by the input region 103 matches a substring of a command supported by the CLI. If a match is found, the command may be predicted to be of interest to the user. In another embodiment, the CLI may determine whether the string of characters matches a particular substring of a command supported by the CLI, such as a prefix or suffix.

In other embodiments, rather than checking for a direct substring match, techniques such as approximate string matching may be employed. Approximate string matching determines an "edit distance" that represents the number of character operations, such as substitutions, insertions, and deletions, necessary to convert one string into an exact match of another string. As such, the CLI may determine predicted commands based upon whether a command is within a threshold edit distance of the partially entered command.

In still other embodiments, the CLI may collect statistics related to the user's previously executed commands, such as the frequency with which a user executes certain commands. The collected statistics may then be used as a factor in determining whether a command is of interest to the user.

In some embodiments, the command at the top of the list may be displayed as a suggestion within the input region 103. For example, referring back to FIG. 5, the top command of input assistance region 202, "Show Config", is displayed as a suggestion within input region 103. In this case, the characters of the suggested command shadow the partially entered command and are displayed with lighter shading than the characters that have already been entered by the user. In an embodiment, the suggested command may display only the name of the command. However, other embodiments may display the full syntax of the command, such as the embodiment illustrated by FIG. 5. In addition, methods other than shading may be used to differentiate characters of the suggested command from the characters entered by the user. For example, characters of the suggested command may be displayed with a different color or with a different font.

3.4 Option Selection

Figure 6:
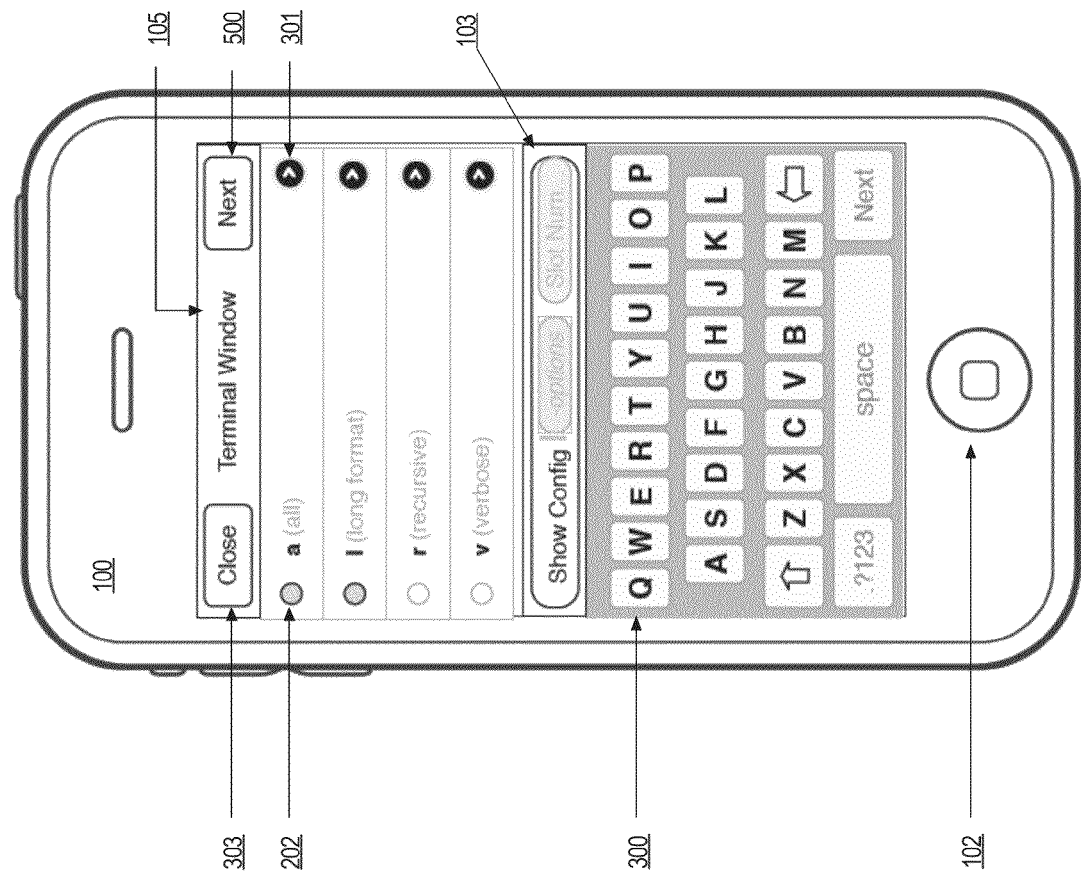
FIG. 6 illustrates an embodiment that displays an option selection screen within the input assistance region.

FIG. 6 illustrates an embodiment that displays an option selection screen within the input assistance region 202. An embodiment may display the arrangement of FIG. 6, for example, when a user is viewing the screen display of FIG. 3 and selects the "Show Config" command in the command list of FIG. 3. The embodiment is run on computing device 100. Computing device 100 contains input device 102 and displays terminal window 105 in a display device such as an LCD display. In an embodiment, input device 102 is a pushbutton. Terminal window 105 displays input region 103, input assistance region 202, keyboard 300, "close" button 303, and "next" button 500. The input region 103 may display a partially entered command, such as the selected command "Show Config", along with syntax that can be followed to augment or complete the command. In an embodiment, the remaining syntax may be displayed with different shading than the partially entered command. For example, the syntax can be given the appearance of being "grayed out" by using lighter shading than the partially entered command. The example syntax in FIG. 6 includes "-options", indicating that options are available, and "Slot Num", indicating that a slot number can be entered as an argument. Input assistance region 202 displays a list of options for the command "show config" and each option is associated with a drill-down button 301 that may be selected to display detailed information about the option. Example options in FIG. 6 are the characters a (all), l (long format), r (recursive), v (verbose), any of which may be used with SHOW CONFIG to form a more expressive or complete command. A set of options displayed within the input assistance region 202 may be selected by, for example, tapping graphical elements next to the options. The "next" button 500 may comprise a user interface widget that is configured to receive a tap, click or other input and, in response, confirm the selection.

In an embodiment, once a command is selected, the input assistance region 202 displays an option selection screen that lists options that are available for the selected command. However, in some cases the selected command may have no options. In such cases, an embodiment might display an empty list or skip the option selection screen. In addition, the CLI may provide a graphical element, such as a "back" button, that returns the input assistance region 202 to a previous display. For example, the input assistance region 202 may return to the command selection screen where the user may select a new command.

As with the list of commands, the input assistance region 202 may not be large enough to display all the options for a command at the same time without substantially degrading readability. Thus, the CLI may display only part of the list at a time and allow the user to search or scroll through the list of options. In addition, the list of options may be ordered in numerous different ways depending on the embodiment. For example, some embodiments may use alphabetical order and others may order based on statistics related to the user's option selection history.

In some embodiments, the user may select or deselect options by, for example, clicking on the options listed by the input assistance region 202. However, in other embodiments, the CLI may provide a graphical element, such a radio button as seen in the input assistance region 202 of FIG. 6, associated with each option that a user may interact with to select or deselect an option. In another embodiment, the user may select options by pressing keys, or a combination of keys, on a keyboard.

In an embodiment, a user may select anywhere from no options to all the options that a command has to offer. However, if certain options are mutually exclusive, the CLI may prevent the mutually exclusive options from being selected simultaneously.

In an embodiment, the selected options may be displayed in a manner that is visually distinct from the options that have not been selected. For example, the selected options may be highlighted or the graphical elements associated with each option may be displayed differently when an option has been selected. In order to finalize the option selection, the user may submit a confirmation such as by pressing a "next" button 500.

Once the options have been finalized, an embodiment may display the name of the selected command along with the selected options within the input region 103 where the command may be edited or entered. In another embodiment, the CLI may not wait for the options to be finalized before displaying them within the input region 103. For example, the input region 103 may add options as they are selected and remove options as they are deselected.

In an embodiment, each option may be associated with a drill-down button 301. Selecting a drill-down button 301 for a particular associated option may cause the input assistance region 202 to display detailed information related to the associated option. For example, the detailed information may provide an explanation of how the option will change the default execution of the selected command. In other embodiments, the detailed information may be displayed in response to a pointer hovering over the option for a set period of time.

Similar to the display of the manual page for commands, displaying detailed information for an option may cause the input assistance region 202 to expand and the input and/or output regions to shrink or close. As such, the terminal window may provide a graphical element such as a "back" button that returns the input assistance, input, and the output regions to their previous sizes and displays.

3.5 Argument Selection

Figure 7:
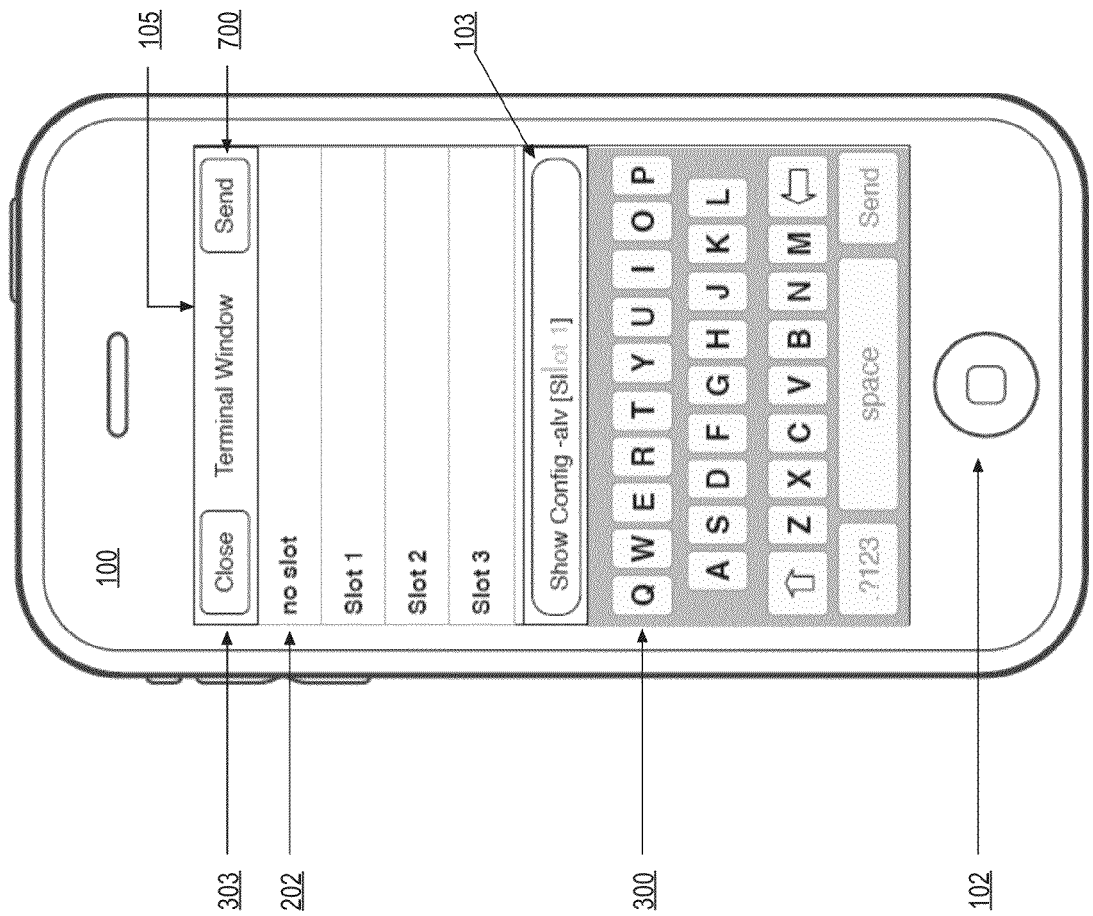
FIG. 7 illustrates an embodiment that displays an argument selection screen within the input assistance region.

FIG. 7 illustrates an embodiment that displays an argument selection screen within the input assistance region 202. The embodiment is run on computing device 100. Computing device 100 contains input device 102 and displays terminal window 105. Terminal window 105 contains input assistance region 202, input region 103, keyboard 300, "close" button 303, and "send" button 700. Input assistance region 202 displays an argument selection screen that lists arguments for the command "Show Config" including the example arguments "no slot", "Slot 1," "Slot 2," "Slot 3". As seen in input region 103, in the example of FIG. 7, the user has already entered the partial command SHOW CONFIG-ALV [SL.

In an embodiment, once the options are finalized the input assistance region 202 displays an argument selection screen as seen in FIG. 7 that lists potential arguments for the selected command. However, if the selected command has no arguments, the list may be empty or the argument selection screen may be skipped. In an embodiment that differs from the embodiment illustrated by FIG. 7, the CLI may provide a graphical element, such as a "back" button, that returns the input assistance region 202 to a previous display, such as the command selection screen or the option selection screen.

As with the list of commands, the input assistance region 202 may not be large enough to display all potential arguments for a command at the same time without substantially degrading readability. Thus, an embodiment may display only part of the list at a time and allow the user to search or scroll through the list of arguments. In addition, the arguments may be displayed in numerous different orders depending on the embodiment. For example, some embodiments may use alphabetical order and others may order depending on statistics related to the user's argument selection history.

In some embodiments, the user may select or deselect arguments by, for example, tapping or clicking on the arguments displayed by the input assistance region 202. However, in other embodiments, the CLI may provide a graphical element, such as radio buttons, for the same purpose.

In an embodiment, the argument selection screen may allow a user to select more than one argument at a time. For example, the argument selection screen may display a list of file names that the user can select as arguments. However, the number of arguments that the user is allowed to select may be dependent upon the selected command. Some commands may require a specific number of arguments, others may allow a number of arguments to be optional, and still others may accept any number of arguments. Thus, an embodiment may ensure that the user selects the correct number of arguments for the command. For example, if the command can only be executed with one argument, the user may be prevented from selecting more than one argument at a time. Alternatively, the user may be allowed to select more than one argument, but may not be allowed to finalize the selection until all but one argument have been deselected. In an embodiment, argument selections are finalized by submitting a confirmation such as by pressing a "next" or "submit" button.

In another embodiment, the CLI may display an argument selection screen for each argument. For example, if a command requires two arguments, two argument selection screens may be displayed before the argument selection becomes finalized as a whole. The first argument selection screen may display potential selections for the first argument and a confirmation button such as a "next" button that finalizes the first selection. Once the first selection is finalized the second argument selection screen may be displayed. The second selection screen may display potential selections for the second argument and another confirmation button that finalizes the argument selection as a whole. In some embodiments, the user may return to a previous argument selection screen by selecting a graphical element such as a "back" button. In addition, although the previous example describes a command with only two arguments, the same principle may be applied to commands with any number of arguments.

In an embodiment, if an argument is optional, the argument selection screen may allow the user to confirm without making a selection. However, in another embodiment such as the one illustrated by FIG. 7, the list of arguments may explicitly include an entry representing that no argument is selected.

In an embodiment, the selected arguments may be displayed in a manner that is visually distinct from the arguments that have not been selected. For example, the CLI may highlight the selected arguments or display graphical elements associated with selected arguments differently than graphical elements associated with arguments that have not been selected.

Once the arguments have been finalized, an embodiment may display the name of the selected command along with the selected options and arguments within the input region 103 where the command may be edited or entered. In another embodiment, the CLI may not wait for the arguments to be finalized before displaying them within the input region 103. For example, the input region 103 may add arguments as they are selected and remove arguments as they are deselected.

3.6 Submission

Figure 8:
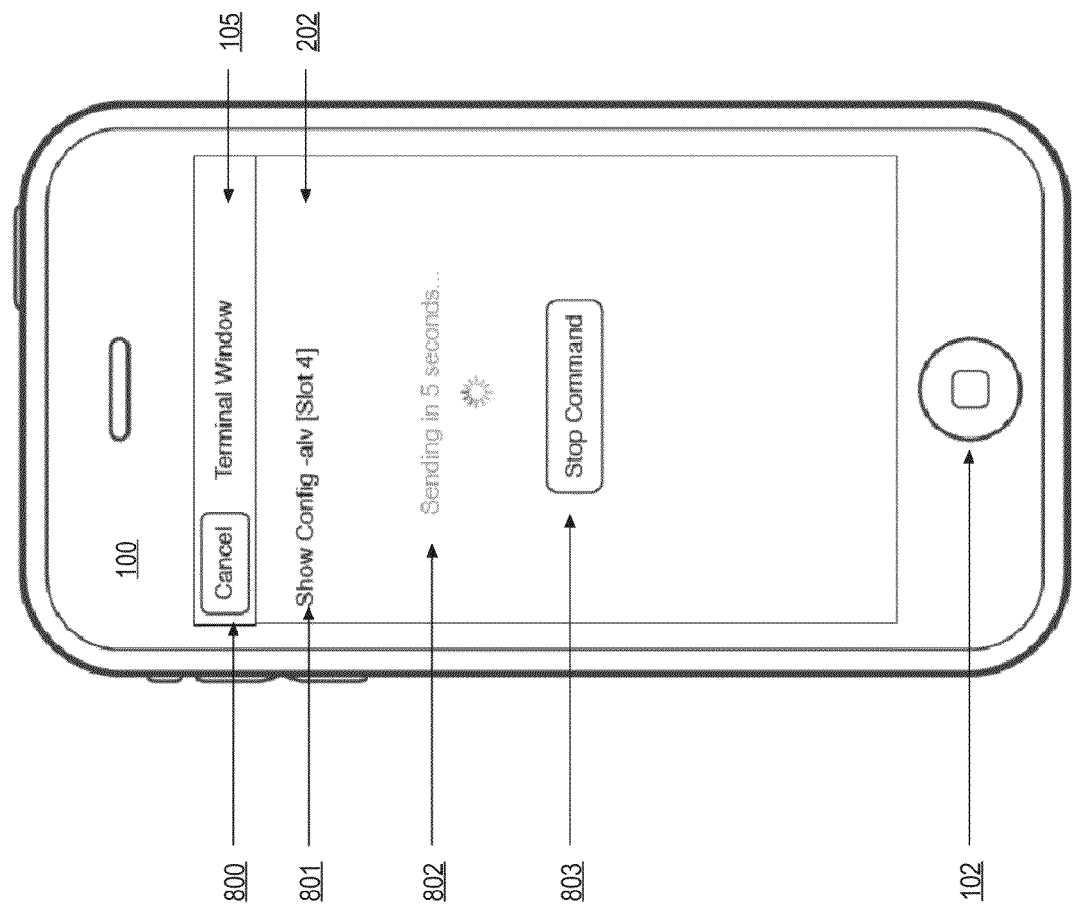
FIG. 8 illustrates an embodiment that displays a submission screen within the input assistance region.

FIG. 8 illustrates an embodiment that displays a submission screen within the input assistance region 202. The embodiment is run on computing device 100. Computing device 100 contains input device 102 and displays terminal window 105. Terminal window 105 contains "cancel" button 800 and input assistance region 202. Input assistance region 202 displays a submission screen for the command "show config" that shows the command that is being executed 801, the time until the command is executed 802, and "stop command" button 803.

In an embodiment, once the command name, options, and arguments have been selected the CLI may execute the command. In some embodiments, the final argument selection screen may provide an indication that the command will be executed after the selection is made. For example, instead of providing a "next" button, the CLI may provide a "send" or "submit" button. However, some embodiments may provide the argument selection screen before the option selection screen. In such embodiments, the option selection screen may display the indication instead.

In some embodiments, the CLI may execute the command immediately after the command name, options, and arguments have been selected. However, in other embodiments, the input assistance region 202 may display a submission screen before the command is executed. The submission screen may contain information related to the command such as the name of the selected command, the selected options, the selected arguments, and a countdown until the command is executed.

In an embodiment, the countdown begins immediately upon entering the submission screen. However, other embodiments may wait until confirmation is received from the user before the countdown begins. For example, an embodiment may wait until a user selects a "confirm" or "submit" button.

In another embodiment, the CLI may provide one or more graphical elements, such as a "cancel" or "stop command" button that prevents the command from being executed. In an embodiment, preventing the command from being executed may return the terminal window to the display just prior to the submission screen. In other embodiments, the terminal window may reset to the default display that was shown before the user began to enter the command. In some embodiments, multiple types of cancel buttons may be provided. For example, an embodiment may provide one button that resets the terminal window to its default display and another that returns the terminal window to its prior display. Furthermore, an embodiment may provide a "pause" button that halts the countdown until the "pause" button is selected again.

In some embodiments, the command is executed by invoking a program that implements the command and passing the selected options and arguments to the program. In an embodiment, the program may be located on the same computing system as the CLI. However, in another embodiment, the program may be located on a remote system. As such, the CLI may communicate with the remote system over a network in order to invoke the program. In an embodiment, once the command has finished executing, the terminal window may return to its default display.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
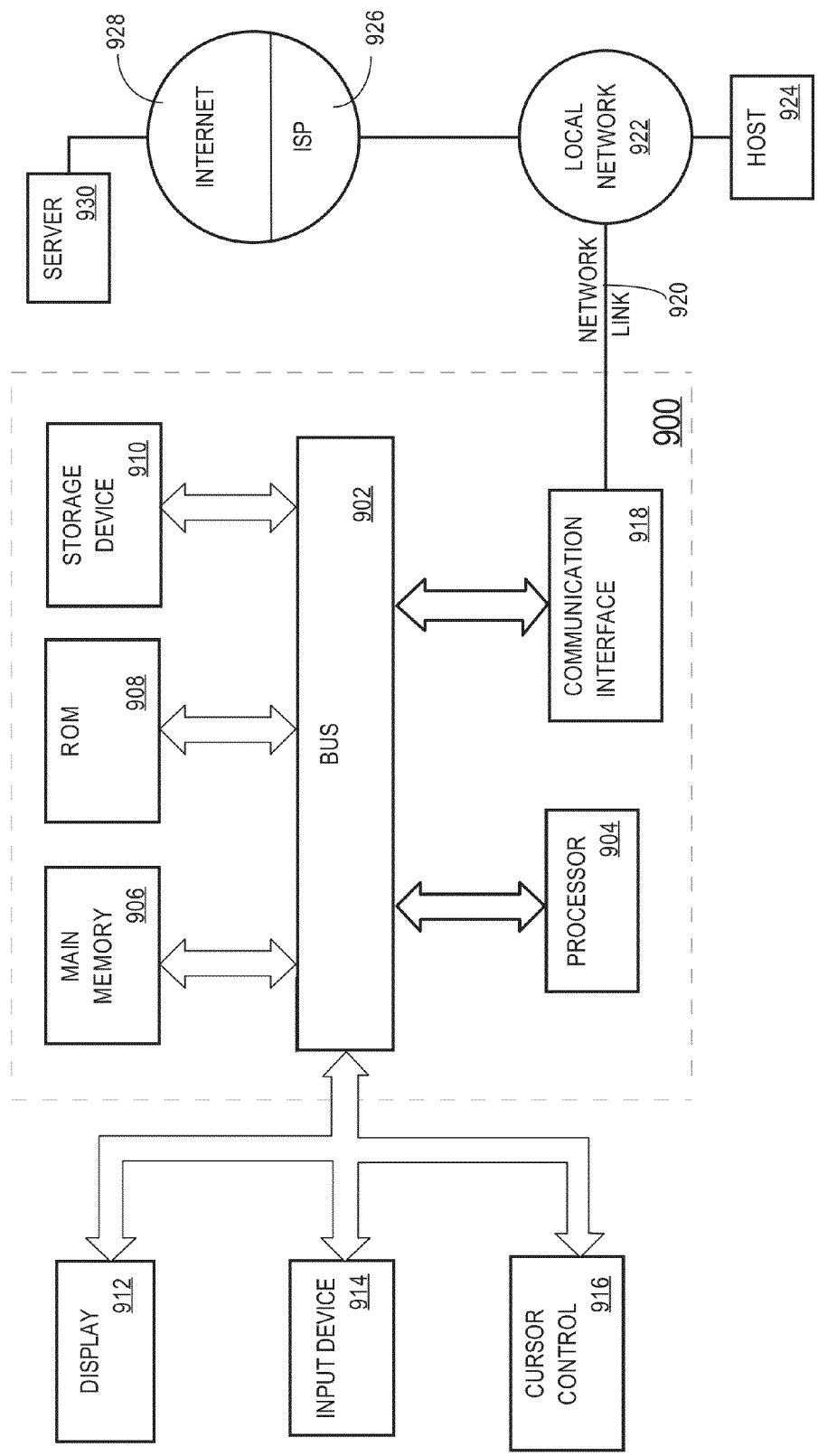
FIG. 9 illustrates a computer system upon which an embodiment could be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
concurrently displaying an input region and an output region of a command line interface;
receiving one or more commands via the input region, wherein each command of the one or more commands comprises one or more characters and identifies an operation of an executable program;
for each command of the one or more commands:
displaying the one or more characters of the command in the input region as each character of the command is received,
executing the command, via the executable program, resulting in an output,
adding the output to an output history, and
resetting the display of the input region prior to accepting a next command;
displaying at least a portion of the output history in the output region; and
scrolling the display of the output region to perform one or more of: adding one or more outputs from the output history to the display of the output region or removing one or more outputs from the display of the output region, wherein the scrolling does not obscure the display of the input region;
wherein the method is performed by one or more computing devices.

2. The method of claim 1, wherein outputs of different commands displayed in the output region are separated by one or more delimiters.

3. The method of claim 1, wherein one or more delimiters identify which command of the one or more commands produced the output displayed after the one or more delimiters in the output region.

4. The method of claim 1, further comprising re-executing a particular command of the one or more commands in response to receiving a selection of a resend graphical element associated with the output of the particular command in the output region.

5. The method of claim 4, further comprising receiving a modification of the particular command before re-execution.

6. The method of claim 1, further comprising:
displaying an input assistance region;
displaying at least a portion of a list of commands supported by the command line interface in the input assistance region;
receiving one or more characters of a new command that is currently being entered into the input region of the command line interface;
re-displaying the portion of thelistof commands based on the one or more characters of the new command.

7. The method of claim 6, further comprising concurrently displaying the input assistance region, the input region and the output region.

8. The method of claim 6, further comprising the computer determining a set of predicted commands of the list of commands supported by the command line interface that have the one or more characters as a sub-string and selecting the portion for re-display from the set of predicted commands.

9. The method of claim 6, further comprising displaying a description of the particular command in response to receiving a selection of a drill-down graphical element associated with the particular command in the displayed portion of the list of commands.

10. The method of claim 6, further comprising displaying a particular command in the input region in response to receiving a selection of a particular command in the displayed portion of the list of commands.

11. The method of claim 10, further comprising:
in response to receiving a selection of the particular command in displayed portion of the list of commands, displaying within the input assistance region a list of options for the particular command;
receiving a selection of a set of options from the list of options;
displaying the particular command with the set of options in the input region.

12. The method of claim 11, further comprising:
in response to receiving a selection of the set of options, displaying within the input assistance region a list of arguments for the particular command;
receiving a selection of a set of arguments from the list of arguments;
displaying the particular command with the set of options and the set of arguments in the input region.

13. The method of claim 12, further comprising executing the particular command with the set of options and the set of arguments in response to receiving input indicating that entering the particular command is complete.

14. A non-transitory computer-readable medium carrying one or more sequences of instructions, which when executed by one or more processors, cause the one or more processors to perform:
concurrently displaying an input region and an output region of a command line interface;
receiving one or more commands via the input region, wherein each command of the one or more commands comprises one or more characters and identifies an operation of an executable program;
for each command of the one or more commands:
displaying the one or more characters of the command in the input region as each character of the command is received,
executing the command, via the executable program, resulting in an output,
adding the output to an output history, and
resetting the display of the input region prior to accepting a next command;
displaying at least a portion of the output history in the output region; and
scrolling the display of the output region to perform one or more of: adding one or more outputs from the output history to the display of the output region or removing one or more outputs from the display of the output region, wherein the scrolling does not obscure the display of the input region.

15. The non-transitory computer-readable medium of claim 14, wherein outputs of different commands displayed in the output region are separated by one or more delimiters.

16. The non-transitory computer-readable medium of claim 14, wherein one or more delimiters identify which command of the one or more commands produced the output displayed after the one or more delimiters in the output region.

17. The non-transitory computer-readable medium of claim 14, further comprising instructions which when executed cause the one or more processors to perform:
re-executing the particular command in response to receiving a selection of a resend graphical element associated with the output of the particular command in the output region.

18. The non-transitory computer-readable medium of claim 17, further comprising instructions which when executed cause the one or more processors to perform receiving a modification of the particular command before re-execution.

19. The non-transitory computer-readable medium of claim 14, further comprising instructions which when executed cause the one or more processors to perform:
displaying an input assistance region;
displaying at least a portion of a list of commands supported by the command line interface in the input assistance region;
receiving one or more characters of a new command that is currently being entered into the input region of the command line interface;
re-displaying the portion of the list of commands based on the one or more characters of the new command.

20. The non-transitory computer-readable medium of claim 19, further comprising instructions which when executed cause the one or more processors to perform concurrently displaying the input assistance region, the input region and the output region.

21. The non-transitory computer-readable medium of claim 19, further comprising instructions which when executed cause the one or more processors to perform determining a set of predicted commands of the list of commands supported by the command line interface that have the one or more characters as a sub-string and selecting the portion for re-display from the set of predicted commands.

22. The non-transitory computer-readable medium of claim 19, further comprising instructions which when executed cause the one or more processors to perform displaying a description of the particular command in response to receiving a selection of a drill-down graphical element associated with a particular command in the displayed portion of the list of commands.

23. The non-transitory computer-readable medium of claim 19, further comprising instructions which when executed cause the one or more processors to perform displaying a particular command in the input region in response to receiving a selection of a particular command in the displayed portion of the list of commands.

24. The non-transitory computer-readable medium of claim 23, further comprising instructions which when executed cause the one or more processors to perform:
in response to receiving a selection of the particular command in displayed portion of the list of commands, displaying within the input assistance region a list of options for the particular command;
receiving a selection of a set of options from the list of options;
displaying the particular command with the set of options in the input region.

25. The non-transitory computer-readable medium of claim 24, further comprising instructions which when executed cause the one or more processors to perform:
in response to receiving a selection of the set of options, displaying within the input assistance region a list of arguments for the particular command;
receiving a selection of a set of arguments from the list of arguments;
displaying the particular command with the set of options and the set of arguments in the input region.

26. The non-transitory computer-readable medium of claim 25, further comprising instructions which when executed cause the one or more processors to perform executing the particular command with the set of options and the set of arguments in response to receiving input indicating that entering the particular command is complete.

27. A system comprising:
a memory comprising instructions executable by one or more processors; and
the one or more processors coupled to the memory and operable to execute the instructions, the one or more processors being operable when executing the instructions to:
concurrently display an input region and an output region of a command line interface;
receive one or more commands via the input region, wherein each command of the one or more commands comprises one or more characters and identifies an operation of an executable program;
for each command of the one or more commands:
display the one or more characters of the command in the input region as each character of the command is received,
execute the command, via the executable program, to obtain an output,
add the output to an output history, and
reset the display of the input region prior to accepting a next command;
display at least a portion of the output history in the output region;
scroll the display of the output region to perform one or more of adding one or more outputs from the output history to the display of the output region or removing one or more outputs from the display of the output region, wherein the scrolling does not obscure the display of the input region.

28. The system of claim 27, wherein the one or more processors are further operable, when executing the instructions, to:
display an input assistance region;
display at least a portion of a list of commands supported by the command line interface in the input assistance region;
receive one or more characters of a new command that is currently being entered into the input region of the command line interface;
re-display the portion of the list of commands based on the one or more characters.

29. The system of claim 27, wherein the one or more processors are further operable, when executing the instructions, to re-execute a particular command of the one or more commands in response to receiving a selection of a resend graphical element associated with the output of the particular command in the output region.

30. The system of claim 28, wherein the one or more processors are further operable, when executing the instructions, to display a description of a particular command in response to receiving a selection of a drill-down graphical element associated with the particular command in the displayed portion of the list of commands.

\* \* \* \* \*